United States Patent [19]

Lund

[11] E Re. 29,387

[45] Reissued Sept. 6, 1977

[54] APPARATUS FOR THE CONTINUOUS MIXING OF GRANULAR MATERIALS

[75] Inventor: Robert S. Lund, Elmhurst, Ill.

[73] Assignee: Pettibone Corporation, Chicago, Ill.

[21] Appl. No.: 753,808

[22] Filed: Dec. 23, 1976

Related U.S. Patent Documents

Reissue of:

[64] Patent No.: 3,730,487
Issued: May 1, 1973
Appl. No.: 175,047
Filed: Aug. 26, 1971

[51] Int. Cl.[2] ..... B01F 7/04

[52] U.S. Cl. ..... 259/6

[58] Field of Search ..... 259/9, 10, 104, 6, 178, 259/179, 21, 25, 26, 45, 46, 109, 110, 192, 193, 191; 416/122; 241/252

[56] References Cited

U.S. PATENT DOCUMENTS

| | | | |
|---|---|---|---|
| 1,725,279 | 8/1929 | Kantmann | 259/10 |
| 1,848,572 | 3/1932 | Loomis | 259/109 |
| 3,064,908 | 11/1962 | Hjelte | 241/252 |
| 3,175,812 | 3/1965 | Russell | 259/164 |
| 3,248,092 | 4/1966 | Atkins | 416/122 |
| 3,346,239 | 10/1967 | Larson | 259/9 |
| 3,348,815 | 10/1967 | Edick | 259/6 |

*Primary Examiner*—Robert W. Jenkins
*Attorney, Agent, or Firm*—Norman H. Gerlach

[57] ABSTRACT

A mixing apparatus adapted for use with granular or semi-solid material and embodying a mixer trough within which are disposed two parallel companion shafts each of which has mounted thereon a linearly straight row of flat slanting parallel mixing blades *of interrupted-elliptical shape*, the two rows of blades functioning when the shafts are rotated in opposite directions to propel the material forwardly while at the same time exerting thereon a slicing action whereby progressively diminishing masses of the material are tossed from side to side and are repeatedly sliced into smaller increments as they progress along the trough.

13 Claims, 12 Drawing Figures

M1
M2
M3
P1
P2

APPARATUS FOR THE CONTINUOUS MIXING OF GRANULAR MATERIALS

Matter enclosed in heavy brackets [ ] appears in the original patent but forms no part of this reissue specification; matter printed in italics indicates the additions made by reissue.

PERTINENT PRIOR ART

Atkins, U.S. Pat. No. 3,248,092, Apr. 26, 1966, *Cl. 259-129.*

OTHER KNOWN ART OF INTEREST

Hjelte, U.S. Pat. No. 3,064,908, Nov. 20, 1962, *Cl. 241-252;*

Russell, U.S. Pat. No. 3,175,812, Mar. 30, 1965, *Cl. 241-252;*

Edick, U.S. Pat. No. 3,348,815, Oct. 24, 1967, *Cl. 259-60.*

The improved mixing apparatus comprising the present invention is designed primarily for use in connection with the conditioning of foundry sand as, for example, where it is desirable to intermix a liquid binder and a liquid catalyst with a mass of dry sand in order to enhance the ultimate hardening factor of the sand when the latter is used in the production of a mold. The invention is, however, capable of other uses and a mixing apparatus embodying the principles of this invention may find a wide variety of industrial uses such as the mixing of granular materials in the production of gypsum or concrete, or in the iodization of salt. The invention is not necessarily limited to the mixing of granular materials and a mixing apparatus embodying the principles of the invention may, if desired and with or without suitable modification as required, be employed for mixing various plastic or other semi-solid materials, or for the mixing of fibrous solids with either liquids or semi-solids. Irrespective, however, of the particular use to which the invention may be put, the essential features of the invention are at all times preserved.

The present invention is specifically concerned with a mixing apparatus of the type which employs an elongated mixing trough having mounted therein at least two parallel, rotatable, blade-carrying shafts which operate in various ways to effect intermixing of different materials in the trough while at the same time impelling the mixture or mixed mass longitudinally to a region of discharge from the trough. The principles of operation ascribed to such type of mixing apparatus vary widely, many of them relying mainly upon a high degree of turbulence within the mixing trough in order to effect an indiscriminate mixing action. Another type of present-day mixing apparatus relies upon a bucking action which takes place between the blades on the two shafts. Still another type of conventional or standard mixing apparatus employs on the shafts thereof helical vanes or blades which set up parallel streams of the mixed materials with internal eddy current flow that sends some of the mass of mixed materials from one stream to the other. A further mixing apparatus now in use utilizes alternate blades or paddles which impart different motion characteristics to the granular or other materials, the change of one type of motion to another being relied upon for producing the mixing action. In some of these present-day mixing [apparatus] *apparatuses,* the blades on the two parallel adjacent shafts intermesh when the shafts are rotated and this intermeshing of blades is relied upon for high mixing turbulence. In other such mixing apparatuses, the shafts are too far apart to permit blade intermeshing so that [whatever] *any* coaction between the blades of adjacent shafts is dependent upon the lateral flinging of granules from one shaft region to the other shaft region. In most of these mixing apparatuses, blade contour is not critical, the only requisite being that forward progression of the mass of materials along the trough with high turbulence be attained. In fact, the particular type of mixing which is involved in connection with present-day mixing apparatus of any of the types heretofore mentioned is almost as varied as the number of apparatuses in which these mixing methods are employed.

The present invention is predicated upon a novel mixing principle wherein two cooperating rotatable, parallel companion shafts having rows of specially shaped fixed blades thereon operate within a mixing trough by a slicing or cutting and camming action to pass masses of the materials alternately back and forth from shaft to shaft, each blade upon receiving a mass serving to sever it into two parts and to pass one of such severed parts to an adjacent blade on the other shaft which, in turn, again severs the mass portion which it receives and feeds it back to the first shaft for further severing. The process is continuous with the discrete masses being sub-divided as many times as there are blades to sever them before discharge from the trough. The basic principle of mixing briefly outlined above is based upon the treatment of a given isolated or discrete mass of materials after the mass has been placed in front of any one of the various mixing blades. It will be understood, of course, that each blade will always receive a full quota of the materials to be mixed for slicing purposes, the received mass of materials representing a consolidation of a large number of previously subdivided masses so that the mixing action is extremely intimate and is of such a complex nature that it defies description in any manner other than on the basis of the treatment of the material mass which lies in front of any given blade at a particular instant of time. The manner in which such a mass is subjected to repeated slicing will become more apparent subsequently when the nature of the individual blades, their disposition on the two shafts, their relative positions with respect to one another, and the direction of rotation of the shafts have been set forth more fully hereafter.

The provision of a mixing apparatus such as has briefly been outlined above and possessing the stated advantages constitutes the principal object of the present invention. Another object of the invention resides in the provision of a pair of novel blade-equipped shaft assemblies each of which is comprised of a series of blade units which are capable of being readily applied to and removed from the associated central shaft for purposes of either blade replacement after the blades have become worn or blade substitution when the character of the blades on the shaft is to be changed in order to attain a different mode of mixing the materials undergoing treatment.

A further object of the invention is to provide a mixing apparatus which is generally of new and improved construction and is characterized by low cost of manufacture, a novel arrangement of parts, and high efficiency and speed of operation.

Numerous other objects and advantages of the invention, not at this time enumerated, will readily suggest themselves as the nature of the invention is better understood from a consideration of the following detailed description.

The invention consists in the several novel features which are hereinafter described and are more particularly pointed out by the claims at the conclusion hereof.

In the accompanying three sheets of drawings forming a part of this specification, two exemplary forms of the invention are disclosed or illustrated.

Figure 10:
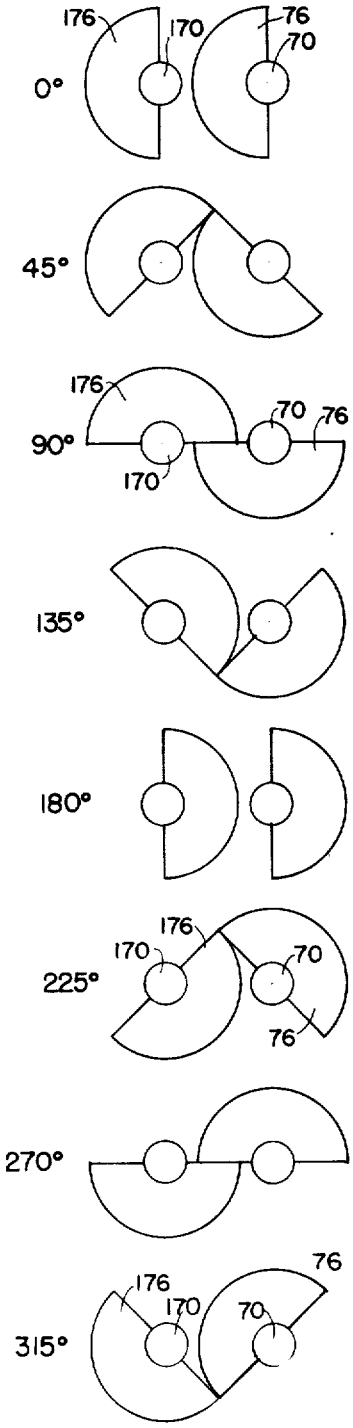
FIG. 10 is a diagrammatic view, entirely schematic in its representation, illustrating in a progressive manner the cooperating relationship which exists between two adjacent and coacting mixing blades as employed in connection with the present invention.
Figure 11:
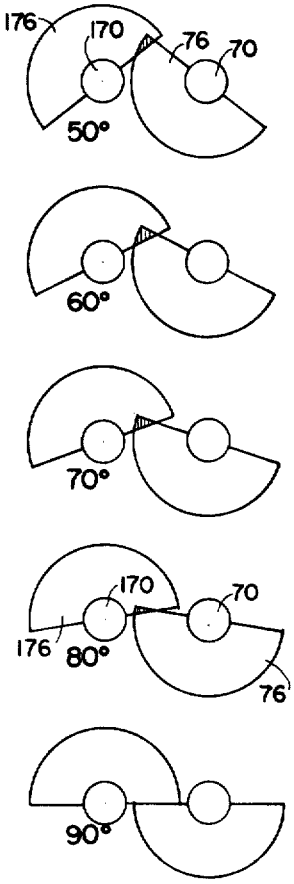
Figure 12:
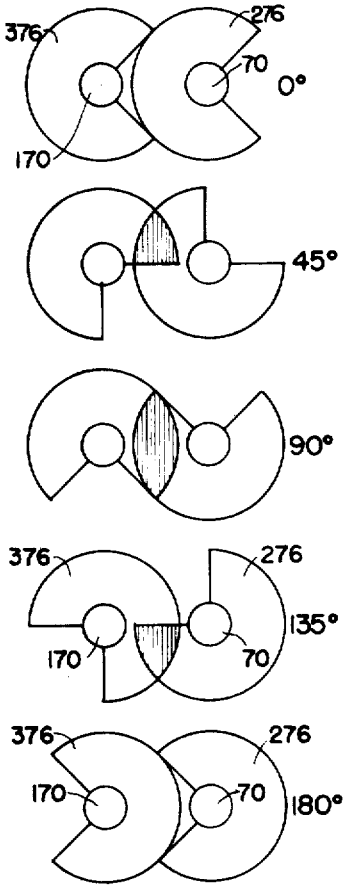
Figure 8:
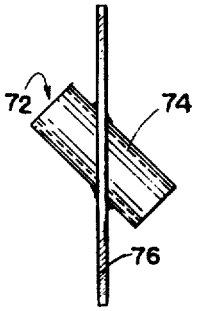
FIG. 8 is a side elevational view of one of the unitary blade units which are employed in connection with the invention.
Figure 9:
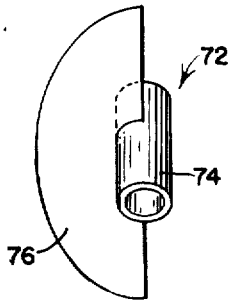
FIG. 9 is front view of the blade unit of FIG. 8.

FIG. 11 is a diagrammatic view similar to FIG. 10 but illustrating in a progressive manner the nature of a nonfunctional or ineffective blade overlap which takes place for a short period of time during each mixing cycle; and FIG. 12 is a diagrammatic view similar to FIG. 10 but showing the mixing blade relationship which obtains when a modified form of mixing blade unit is operatively installed within the mixer trough.

Referring now to the drawings in detail and in particular to FIGS. 1 to 4, inclusive, a mixing apparatus embodying the principles of the present invention is designated in its entirety by the reference numeral 10 and is shown as being operatively installed in a suitable environment including a frame-like pedestal 12 which serves rotatably to support a turntable 14 having [turntable bearings] *therebelow an annular ball bearing* 15 (see FIG. 3), and on which the mixing apparatus 10 is effectively carried. As will be described in greater detail presently, the frame-like pedestal 12 serves to support a pair of motor-driven pumps P1 and P2 by means of which respective liquid materials as, for example, a catalyst and a binder, may be fed when and if necessary to the mixing apparatus 10 in a controlled manner for admixture with the granular or pulverulent materials undergoing mixing. The environmental disclosure of FIGS. 1 to 4, inclusive, is purely conventional and no claim is made herein to any novelty associated with the same, the novelty of the present invention consisting rather in the construction of the mixing apparatus 10 per se and it will be understood that other environments of a widely differing nature may be devised to accommodate the particular uses to which the mixing apparatus 10 will or may be put.

Still referring to FIGS. 1 to 4, inclusive, the mixing apparatus 10 involves in its general organization an elongated, upwardly opening, mixing trough 20 which is adapted to receive therein the materials to be mixed, together with the means for mixing the same. This trough and the mixing means that is associated therewith constitute the principal feature of the present invention and a full and comprehensive description thereof will be set forth subsequently, it being deemed sufficient for the present to state that the mixing means which is disposed within the trough embodies two spaced apart, parallel, cooperating, material mixing and impelling shaft assemblies 21 and 22 (see FIG. 4) which extend horizontally, rotate in opposite directions, and are provided with mixer blades which cooperate with one another in a novel manner to effect a repeated subdivision of the mass of materials within the mixing trough 20 by a cutting or slicing action, while at the same time causing the sub-divided masses to flow longitudinally along the trough to a region of discharge, all in a manner that will be made clear hereafter.

Various means may be provided for supporting the mixing trough 20, but in the illustrated form of the invention, the trough is removably carried by a frame structure including a square base plate 23 which is centrally disposed on the turntable 14 and from which there projects radially outwardly of the turntable an elongated, horizontally positioned, base frame 24. Four quadrilaterally arranged posts 26 project upwardly from the base frame 24 and serve to support at their upper ends a superstructure 28 which constitutes a support for a vertically extending feed tube 30. The latter communicates with a superjacent hopper 32 for the granular or other materials to be mixed and has the lower end thereof in communication with the rear end region of the mixing trough 20. The superstructure 28 also serves to support a conventional fluid-actuated gate arrangement 34 including a horizontal sliding cut-off gate 36 which cooperates with a manually operable sliding flow control damper plate 38.

Figures 1, 2, 3:
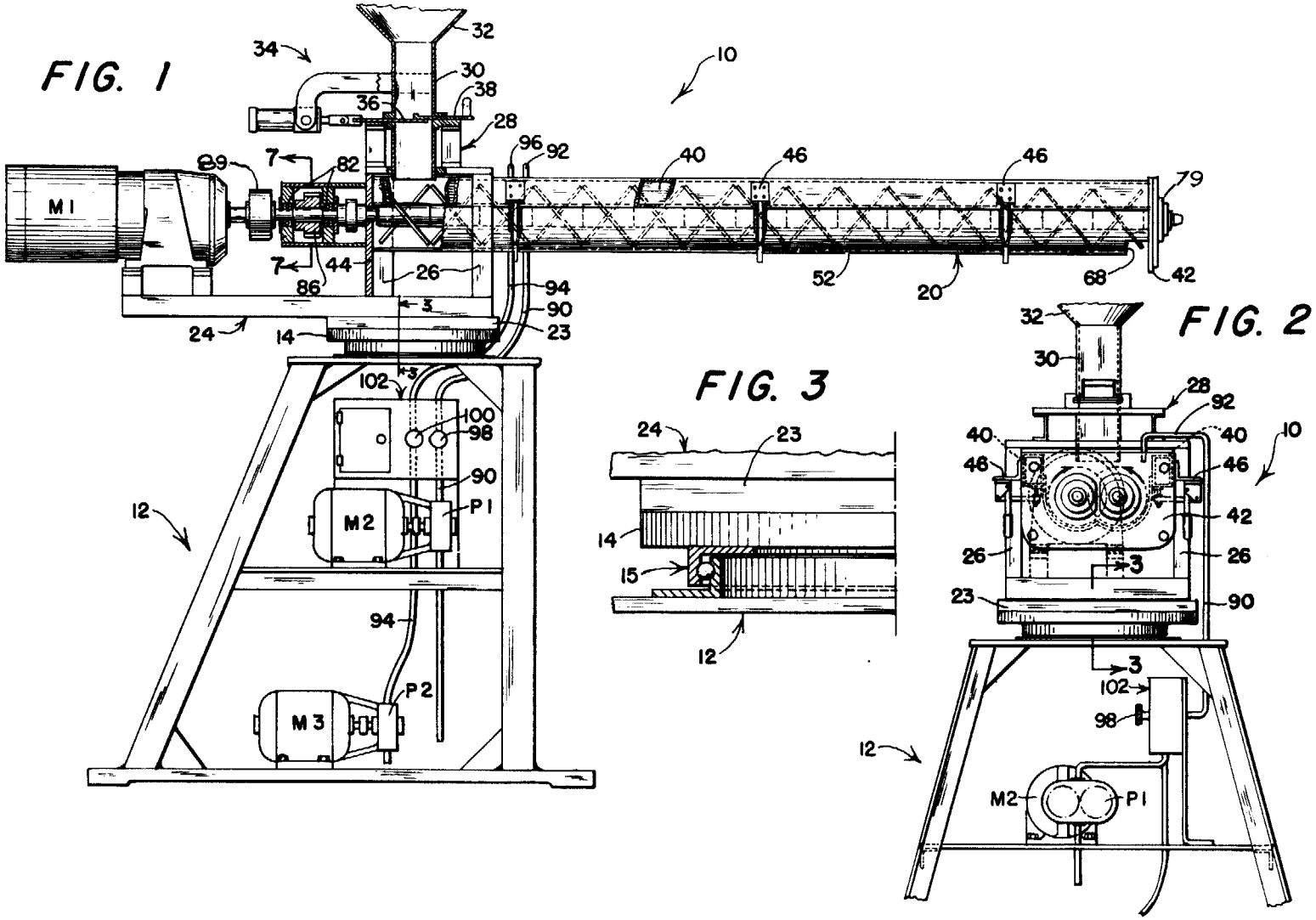
FIG. 1 is a side elevational view, partly in section, of a mixing apparatus constructed according to the present invention.
FIG. 2 is a front elevational view of the apparatus.
FIG. 3 is an enlarged fragmentary vertical section taken on the line 3—3 of FIG. 1.

Suitably secured to the upper end regions of the four posts 26 and projecting outwardly of the turntable 14 is a pair of spaced apart, horizontally extending, rectangular, tubular, trough supports 40 to the outer or forward ends of which there is secured to a front closure plate 42 for the mixing trough 20. An inner or rear closure plate 44 for the trough is secured to the inner ends of the supports 40, the lower edge of such plate being supported on the base frame 24 as shown in FIG. 1. Angle pieces 46 are secured to the outer sides of the two trough supports 40 at spaced regions therealong and constitute reaction anchor members for a plurality of trough latching devices 48, the nature of which will be made clear subsequently.

Figures 4, 5, 6, 7:
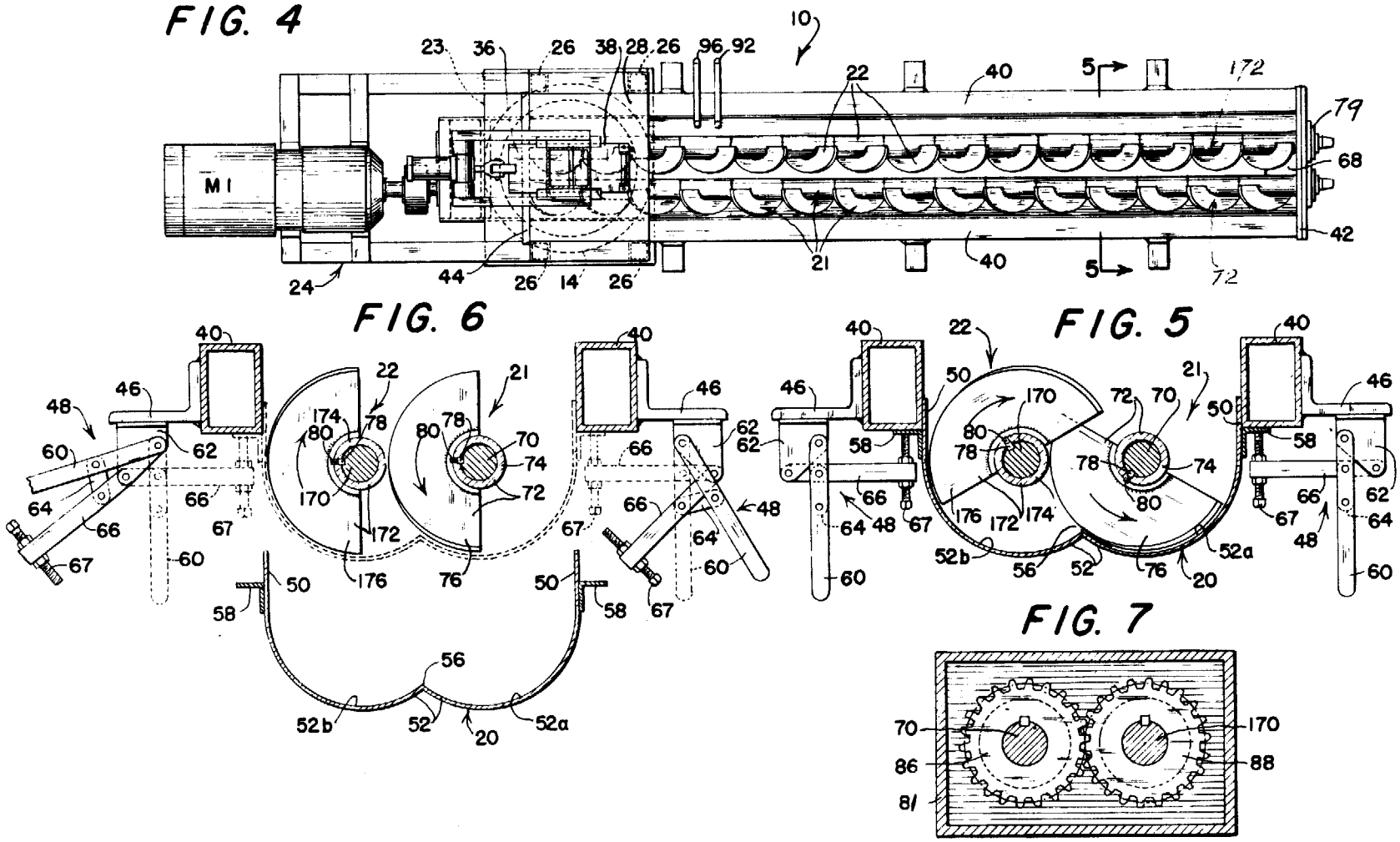
FIG. 4 is a top plan view of the mixing apparatus of FIG. 1.
FIG. 5 is an enlarged vertical *transverse* sectional view taken on the line 5—5 of FIG. 4, such view showing the removable mixing trough of the apparatus locked in position on the apparatus framework, *and also showing the blades after being rotated in the direction of the arrows 240° from the blade positions shown in FIG. 4;*
FIG. 6 is [an exploded] *a vertical transverse sectional* view[,] similar to FIG. 5 but illustrating the manner in which the mixer trough is released from the framework for apparatus cleaning purposes *and showing the blades after being rotated in the direction of the arrows 180° from the blade positions shown in FIG. 4;*
FIG. 7 is an enlarged vertical *transverse* sectional view taken on the line 7—7 of FIG. 1.

As best shown in FIGS. 5 and 6 of the drawings, the mixing trough 20 may be formed of relatively heavy gauge sheet metal, and it is provided with two spaced apart and upstanding trough sides 50 and a divided two-channel trough bottom 52, the latter defining two shallow semi-cylindrical trough channels 52a and 52b which are separated by a longitudinally extending saddle 56 of relatively small height *and have the shaft assemblies 21 and 22 disposed respectively therein.* The upper margin of each trough side wall 50 has welded thereto a horizontally extending angle bar 58, the horizontal flange of which lies a short distance below the common plane of the trough rim. The spacing between the two trough supports 40 is such that the mixing trough may be removably applied to these supports by causing the latter to straddle the trough sides 50 in the manner shown in FIG. 5 with the horizontal flanges of the angle bars 58 bearing upwardly against the underneath sides of the supports. In order to clamp the mixing trough 20 in position against the supports 40, the aforementioned trough latching devices 48 are utilized. Such devices are in the form of conventional over-center toggle linkage mechanisms, each mechanism including a manually operable lever 60, one end of which is pivoted to a bracket 62 which depends from the horizontal part of one of the angle pieces 46. Said lever 60 pivotally carries at its medial region a toggle link 64, which, in turn, is pivotally connected to a trough-clamping arm 66, the latter having one end thereof pivoted to the bracket 62. The length of the toggle link 64 and the points at which it is pivotally connected to the lever 60 and the arm 66 are determined according to well-known toggle linkage principles so that when the lever 50 is swung outwardly to the retracted position in which it is shown in FIG. 6, the link 64 maintains the trough-clamping arm 66 free from the trough 20. When the lever 60 is swung inwardly to the position wherein it is shown in FIG. 5, the clamping arm 66 effectively engages the underneath side of the associated angle bar 58 and forces the same upwardly against the adjacent support 40, while at the same time the toggle link 64 moves slightly past its dead-center position to lock the latching device in its trough-clamping position. The free end of the clamping arm 66 is provided with an adjusting screw arrangement 67 by means of which the clamping pressure which is exerted on the angle bar 58 may be regulated. The various trough-latching devices constitute together one exemplary means whereby the mixing trough 20 may be releasably secured in position on the two supports 40 and it will be understood that other suitable means are contemplated. It is to be noted at this point that the length of the mixing trough 20 is such that when the trough is in its clamped position on the supports 40, the opposite ends of the same bear against the two closure plates 42 and 44 in sealing relationship.

As best illustrated in FIGS. 1 and 4, the forward end region of the trough bottom 52 is relieved *or cut away* in order to provide a downwardly facing discharge opening 68 for the materials undergoing mixing in the trough 20.

Considering now the nature of the material mixing means which is disposed in and operates within the confines of the mixing trough 20, the aforementioned shaft assemblies 21 and 22 are of similar construction and, therefore, a description of one of them will suffice largely for both of them. Considering first the assembly 21, this assembly includes a central blade-supporting shaft 70 on which there is mounted a longitudinal series of blade units 72 (see FIGS. 5, 6, 8 and 9). Each blade unit is in the form of a central sleeve or hub 74 to which there is suitably affixed as by welding a mixing blade 76. The blade 76 is in the form of a flat *imperforate* disk having an interrupted-elliptical contour as clearly shown in FIG. 9, the blade being affixed to the hub 74 so that the plane thereof intersects the axis of the shaft at a relatively sharp angle which may be on the order of 45°. *As shown in FIGS. 1, 4, 5, 6, 8, 9, 10 and 11 of the drawings, the blades 76 and 176 are all semi-elliptical and longitudinal registry and are the same in size. Each blade has a major and a minor axis both of which intersect the longitudinal axis of the associated shaft, the minor axis extending at a right angle to the longitudinal axis of said shaft and the major axis being inclined relatively to said longitudinal axis.* The various blade units 72 are telescopically received on the shaft 70 in end-to-end abutting relationship and in such a manner that all of the blades 76 extend in prallelism and are tilted with respect to the shaft 70 so that they present a left-hand pitch angle, which is to say that when the shaft 70 and the blade units 72 are rotated in a clockwise direction within the mixing trough 20, the action which the blades 76 of the units 72 exert upon the materials undergoing mixing will be a forward one, tending to move the mass of materials along the trough channel [52b] *52a* toward the discharge opening 68. Suitable means are provided for securely anchoring the blade units 72 to the shaft 70 and, accordingly, the units may be either keyed to the shaft as indicated at 78 or secured to the shaft by set screws 80.

The shaft assembly 22 is similar to the shaft assembly 21 and, therefore, in order to avoid needless repetition of description, similar reference numerals but of a higher order have been applied to the corresponding parts as between the disclosures of the two assemblies. It is to be noted, however, that whereas the flat mixing blades 76 are applied to their respective hubs 74 so as to present a left-hand pitch angle, the blades 176 of the blade units 172 on the shaft 170 are applied to the hubs 174 so that they present a right-hand pitch angle. This reversal of the pitch angle between the two sets of blades 76 and 176, coupled with the fact that the two shaft assemblies are caused to rotate in the opposite directions, results in novel mixing phenomena, the nature of which will be described in detail subsequently when the operation of the mixing apparatus 10 is set forth.

In order to effect rotation of the shaft assemblies 21 and 22 in opposite directions, the forward ends of the shafts 70 and 170 are rotatably journalled in bearings 79 on the front closure plate 42, while the rear ends of the shafts pass through openings in the rear closure plate 44 (see FIG. 1), project into a gearbox 81 on such closure plate, and are rotatably journalled in bearings 82 which are carried by said gearbox. A pair of mating gears 86 and 88 (see FIG. 7) on the shafts 70 and 170 constrain the two shafts to rotate in opposite directions under the power supplied by an electric motor M1 which is suitably mounted on the base frame 24 and is operatively connected in driving relationship to the shaft 70 by means of a coupling device 89.

In the operation of the above-described mixing apparatus 10, various means for supplying the materials to be mixed to the mixing trough 20 are contemplated, depending, of course, upon the nature of the materials which are to be mixed. The hopper 32 and its discharge tube 30 constitute one exemplary means for supplying sand which is to be conditioned for foundry use to the mixing trough 20 while the pumps P1 and P2 are provided for the purpose of effecting a flow of a suitable catalyst and a liquid binder to the trough. Accordingly, the pump P1 which is driven by an electric motor M2 has its input side connected to a suitable source of the catalyst and its output side connected through a flexible conduit 90 to a faucet-like discharge nozzle 92 which overhangs one of the supports 40 and discharges its material directly into the trough 20 at a region adjacent to the sand discharge tube 30. The pump P2 which is driven by an electric motor M3 is similarly connected through a flexible conduit 94 to a second discharge nozzle 96 which delivers the liquid binder to the trough. Manually operable control valves 98 and 100 are interposed respectively in the conduits 90 and 94 and constitute elements of a control panel 102 whereby the flow of these liquid materials to the nozzles 92 and 96 may be regulated and also whereby other apparatus functions such as control of the electric motors M1, M2 and M3 may be performed.

The novelty of the present invention is predicated largely upon the design of the various mixing blades of the aforementioned blade units; the reverse slope of the two series of blades with respect to the longitudinal axes of the shafts on which the blade units are mounted; the fact that the shafts rotate in opposite directions in timed relationship; the "reach" or mean diameters of the blades coupled with the lateral distance or spacing between the blade-supporting shafts; and the relative positions which the blades on [each] *one* shaft assume with respect to their counterpart blades on the other shaft, both longitudinally and angularly during each complete rotation of the two shafts 70 and 170. These phenomena are such that during simultaneous rotation of the two blade-supporting shafts 70 and 170 throughout one complete revolution, there is no appreciable or effective intermeshing of the blades on either shaft with the blades on the other shaft, this absence of blade intermeshing or overlap being diagrammatically illustrated in FIG. 10 and serving to effect mixing functions of a novel character and the details of which will now be fully set forth.

Insofar as the longitudinal positioning of the blades 76 and 176 on the shafts 70 and 170 is concerned, the blade units 72 and 172 are disposed on the shafts 70 and 170 in side-by-side relationship as distinguished from a staggered positioning. Thus, each blade 76 [and] *has* a counterpart blade 176 which is accurately and laterally spaced therefrom. Despite this side-by-side positioning of counterpart blades, and the face that the *two series of* blades turn in opposite directions, there is no interference by one blade with the movement of its counterpart blade as would be the case if their direction of rotation were the same or if at the commencement of each blade cycle [or] *of* rotation the blades were not disposed so that they extend in the same direction as illustrated in the uppermost blade position of FIG. 10, or as would be the case if the counterpart blades were not of reverse pitch angle.

In FIG. 10, the eight blade positions represent progressive blade movements of one pair of counterpart or adjacent blades 76 and 176 from an initial 0° position wherein both blades assume similar positions on the same side of their respective shafts, through a series of 45° increments of motion up to their 315° position where the next 45° increment of motion would restore them to their initial 0° position. In considering these views, it should be borne in mind that the various blades 76 and 176 are truly planar and that their contour is semi-elliptical although they appear as semi-circles because they are being viewed at an approximately 45° angle. Thus, in the 45° position of the two blades as shown in the next to the top view of FIG. 10, the tip of the blade 76 appears to be in contact with the tip of the blade 176 but actually is far in front of such tip. Similarly, in the 225° position of the two illustrated blades, the tip of the blade 76 is far behind the tip of the blade 176. For this reason, clearance between adjacent blades is always present and, furthermore, there is no overlapping of the blades in any of the illustrated blade positions of FIG. 10.

Actually, with the illustrated blade sizes, contours, and spacing, a very small but non-functional or non-effective overlapping of blade tips does take place between the 45° and the 90° positions, and this small overlap is illustrated in FIG. 11 where blade movements in increments of 10° are shown commencing with the 50° position and ending with the 90° position. A second range of insignificant blade overlap also takes place immediately after the 270° position where the faster circular movement of the tip of the blade 76 causes it to cut over the inner region of the adjacent edge of the blade 176. However, since the latter edge is receding, this slight overlap is soon diminished to nothingness and all blade overlap disappears at the 315° position of the two illustrated blades.

Functionally, this absence of appreciable blade overlap is of importance insofar as material mixing and material impelling along the trough channels 52a and 52b are concerned. Considering now a situation where sloping blades of full elliptical contour are concerned, such blades are well known, and when rotated in a material media, the action which takes place is one of pushing the material forwardly on one side of the central shaft and pushing the material backwardly on the other side of the shaft. Thus, in the present instance, that portion of the elliptical blade which normally would function to push the material backwardly has been removed to the end that the remaining portion acts in the manner of a propeller blade on a boat and at all times forces the material forwardly along the trough channel with which it is associated. Furthermore, because the blades 76 and 176 are of reverse pitch angle and the shafts 70 and 170 rotate in opposite directions, the blades on each shaft function to propel the material forwardly along the two trough channels 52a and 52b. However, by reason of their respective pitch angles, the blades 76 *and 176* exert a cutting or slicing action on the intermixed material and, in so doing, their effect is a camming one wherein progressively diminishing masses of the material are tossed from side to side and channel to channel where they are repeatedly sliced into smaller sized increments as they progress along the trough and until they are thoroughly and intimately intermixed. For maximum efficiency, the damper plate 38 is adjusted to maintain a material level in the trough 52 which does not exceed the maximum height of the blades 76 and 176.

It will be appreciated, of course, that the theoretical considerations set forth above are predicated upon the treatment of an isolated wad or mass of the material which is delivered to the receiving end of the trough and is then pushed by the first blade 76 from the channel 52a into the channel 52b where it is sliced in half by the first blade 176 and pushed back into the channel 52a for slicing into fourths by the second blade 76. Actually, however, the material issuing from the discharge tube 30 is continuous, especially if it is dry granular material. Furthermore, considering a given blade 76 or 176 in the medial region of the trough 52 which, according to the theoretical considerations set forth above has subdivided a given mass of the material into 64 or 128 parts, for example, this particular blade may be regarded as the first blade of a new series of blades which follow it so that it is in reality commencing the sub-division of an entirely new wad or mass which is comprised of innumerable previously sub-divided masses. In this manner, extremely intimate mixing of the material takes place by a geometrical progression of sub-divisions which is difficult to imagine. In actual practice, equal quantities of white and black sand which have been dumped into the trough 52 at the inlet end thereof have blended to a uniform grey color before the sand mixture has progressed beyond the fourth pair of adjacent blades 76 and 176 in the series. Obviously then, any material which has been subjected to the cutting and impelling action of all of the blades within the trough 52 will issue from the discharge outlet 68 in a thoroughly and intimately mixed condition.

In the form of the invention illustrated in FIGS. 1 to 9, inclusive, it has been pointed out in the description thereof that because of the fact that those portions of the flat elliptical blades 76 and 176 which ordinarily would impart a backward movement to the material in the mixer trough 20 have been removed, only forward movement of the material takes place. It has also been stressed that there is no appreciable or effective blade intermesh or overlap and, consequently, no compression or "squeezing" or mulling action is imparted to the material. However, under certain conditions as, for example, in the reconditioning of foundry sand, it may be found desirable intimately to mix a catalyst and a binder with the sand by a mulling action wherein the individual granules are forcibly pressed into intimate contact with one another in order to insure an even coating on every granule of the binder material. In such an instance, the necessary sand turbulence and compression may be obtained by utilizing flat [semi-elliptical] *interrupted-elliptical* mixer blades which, *instead of being truly semi-elliptical,* possess areas of sand regression by reason of the fact that not all of the areas which ordinarily would produce backward sand movement are relieved. Such a mixer blade is illustrated in the diagrammatic disclosure of FIG. 12 wherein the blade relief area on the blades [270] *276* and the relief area on the opposed blades 376 are on the order of 90°. These [interrupted-elliptical] *three-quarters elliptical* blades may conveniently be formed in the same manner as the blades 76 and 176 are welded to central hubs (not shown) in order to produce mixer blade units similar to the units 72 and 172 of FIG. 1 which are then mounted on the shafts 70 and 170 in place of the units 72 and 172.

Reference to FIG. 12 will reveal the fact that varying amounts of blade overlap take place during the entire 360° cycle of blade operation except for the exact instant of time when the blades are in their 0° and their 180° positions. Maximum blade overlap occurs in the 90° and 270° positions where there is an approximate 25% blade overlap. The same slope and pitch conditions obtain in connection with the blades 276 and 376 as obtain in connection with the blades 76 and 176, as does the same condition of reverse rotation of the shafts 70 and 170.

It will be appreciated that in the overlap regions which, in the various positions illustrated in FIG. 12, are shown as being shaded, a portion of the mixer blade 276 which overlaps a portion of the mixer blade 376 represents a portion which exerts a backward thrust upon the sand. This portion opposes a portion of the blade 376 which exerts a forward thrust upon the same. Therein lies the squeezing or scrubbing action which invariably is sought for in a commercial [said] *sand* mulling apparatus. Furthermore, since the predominant thrust which is exerted upon the sand by all of the blades, considered collectively, forward sand movement along the trough 52 is continuously maintained.

In either of the above-described forms of the invention, certain principles of mixing hold true. Generally speaking, the degree of the mix is a function of the length of the trough 52 and the configuration of the blades, while the rate of flow of the material undergoing mixing from the discharge outlet 68 is a function of the r.p.m. of the shaft assemblies 72 and 172 and the pitch angle of the blades.

The invention is not to be limited to the exact arrangement of parts shown in the accompanying drawings or described in this specification as various changes in the details of construction may be resorted to without departing from the spirit or scope of the invention. For example, although the trough channels 52a and 52b are illustrated and described herein as being curved on a cylindrical bias, while the contour of the various mixer blades is stated to be semi-elliptical, it is within the purview of the invention to construct the blades so that they present a semi-circular contour, in which case the curvature of the trough channels will be shaped so as to be commensurate with the surfaces of revolution which are generated by the particular shape of the blades when the shafts on which they are mounted are rotated. Thus, throughout this specification and in the appended claims, the term "elliptical" is to be construed as being inclusive of a circle which, in a sense, is a special form of an ellipse or, in other words, it is an ellipse in which the major and minor axes are equal in length. Furthermore, although the various blades 76 and 176 in the first described form of the invention, and the blades 276 and 376 in the second form of the invention, have been shown and described as existing in longitudinal alignment along the respective shafts on which they are mounted, it is contemplated that under certain circumstances it may be found advantageous to arrange these blades in a helical row of long pitch so that each blade assumes a slightly angularly displaced position with respect to the adjacent blades on the shaft. By such an arrangement, the cooperation between companion blades on the two shafts will remain the same as has been described herein. Therefore, only insofar as the invention is particularly pointed out in the accompanying claims is the same to be limited.

Having thus described the invention what I claim as new and desire to secure by Letters Patent is:

1. In a mixing apparatus for granular material, in combination, an elongated mixing trough providing a longitudinal flow path and having a receiving and a discharge end, a pair of parallel companion shafts rotatable in said trough, a plurality of axially spaced sloping parallel interrupted-elliptical disk-like mixing blades on each shaft, the blades on the two shafts having equal but reverse pitch angles and being disposed in transverse pairs, said blades, in one position of the shafts, projecting predominately laterally in the same direction, the maximum radial projection of the blades from the shaft being slightly less than the distance between said shafts, and means for rotating said shafts in unison and in opposite directions whereby the blades of each pair traverse a common portion of said flow path alternately.

2. In a mixing apparatus, the combination set forth in claim 1 and wherein the blades on each shaft are effectively disposed entirely on one side of a longitudinal axial plane whereby overlapping of the paired blades is avoided.

3. In a mixing apparatus, the combination set forth in claim 1 and wherein said mixing trough is provided with a divided trough bottom establishing a pair of trough channels along said flow path and the surfaces of the channels are extended surfaces of revolution which are generated by revolution of said blades about the axes of the companion shafts.

4. In a mixing apparatus, the combination set forth in claim 3 and wherein each [semi-elliptical] *interrupted-elliptical* blade has a major and a minor axis both of which intersect the longitudinal axis of the associated companion shaft, the minor axis extending at a right angle to said longitudinal axis and the major axis being inclined relatively thereto.

5. In a mixing apparatus, the combination set forth in claim 4 and wherein said trough channels are separated by a linear saddle peak.

6. In a mixing apparatus, the combination set forth in claim 4 and wherein the pitch angle of each blade is on the order of 45°.

7. In a mixing apparatus, the combination set forth in claim 4 and wherein each blade is in the form of an ellipse which is divided linearly along its major axis so as to define a half-ellipse.

8. In a mixing apparatus, the combination set forth in claim 1 and wherein each blade has a portion thereof which projects laterally from its associated shaft in a direction opposite to said predominant direction whereby, upon rotation of said shafts in opposite directions, progressive overlapping of said latter portions of the paired blades periodically takes place.

9. In a mixing apparatus, the combination set forth in claim 1 and wherein each blade is fixedly mounted on a central tubular sleeve-like hub, the various hubs are telescopically and removably mounted on the respective companion shafts in end-to-end contiguity, and means are provided for preventing both angular turning and longitudinal shifting of the hubs on their respective shafts.

*10. In a mixing apparatus, the combination set forth in claim 1 and wherein the blades on each shaft are the same in size and shape, are arranged in registering relation, and are all inclined in one direction.*

*11. In a mixing apparatus, the combination set forth in claim 10 and wherein each blade is substantially semi-elliptical and has its dividing line along its major aixs.*

*12. In a mixing apparatus, the combination set forth in claim 10 and wherein each blade is substantially three-quarters elliptical.*

*13. In a mixing apparatus, the combination set forth in claim 10 and wherein each blade is flat and imperforate.*

* * * * *